Reissued Apr. 24, 1928. Re. 16,943

UNITED STATES PATENT OFFICE.

RALPH PAGE JUDD, OF CLEVELAND, OHIO.

LUBRICATING COMPOUND.

No Drawing. Original No. 1,449,608, dated March 27, 1923, Serial No. 380,598, filed May 11, 1920. Application for reissue filed September 9, 1926. Serial No. 134,568.

My invention relates to improvements in lubricating compounds, and more particularly to that class or type of such compounds which are designed and adapted for use in lubricating the bearings of heavy machinery, the improved lubricant being particularly well adapted for use in bearings subjected to great weight and use, as for example heavy bearings or gears in machinery, car axles, and the like.

The improved lubricating compound possesses the desired properties of not gumming, of retaining a uniform consistency, of being nonfrictional, of being cooling and non-congealable in its properties to an extraordinary degree, and consequently is not rendered particularly thin in the summer season or during relatively high temperatures, or thick in the winter season or during very low temperatures. My improved lubricating compound preferably comprises the following ingredients prepared and combined in the manner hereinafter referred to.

The "zinc white" (oxide of zinc) and the lubricating oil may be of the ordinary commercial form.

In preparing the above, about one hundred pounds of zinc white is mixed or thoroughly incorporated in about five gallons of lubricating oil, or in such proportion as to make a lubricant compound of heavy consistency similar to grease, or of a semi-liquid nature. On account of the varied consistency of commercial lubricating oils, the proportion of the oil to ten parts of zinc white may vary from about three to five parts of the former to provide the proper mixture of the consistency of a heavy grease. The zinc white is first reduced to a finely ground or divided condition, and is then added to the lubricating oil, the latter being constantly stirred so that the entire mass will be thoroughly commingled.

After the whole mass has been thoroughly mixed, it is still further reduced to the required consistency by any suitable grinding process, after which the compound will be ready for use or in condition for transportation in proper receptacles.

Under certain conditions other ingredients may be added to the above by correspondingly reducing the proportion of the zinc white. For example, under certain conditions finely divided graphite and asbestos may be added, say by reducing the zinc white to six parts and adding two parts graphite and two parts asbestos, or if desired,—adding four parts of graphite to six parts of zinc white.

Having thus described my improved lubricating compound, and a suitable means for making the same, what I claim and desire to secure by Letters Patent, is,—

1. A lubricating compound consisting of lubricating oil thickened to the consistency of heavy grease by finely divided zinc white, in substantially the proportion of about five gallons of the oil and one hundred pounds of the zinc white.

2. A lubricating compound consisting of lubricating oil thickened to the consistency of heavy grease by finely divided zinc white and graphite in substantially the proportion of about five gallons of the oil and about one hundred pounds of the zinc white and graphite, the zinc white being in excess of the graphite.

3. A lubricant compound consisting of five gallons of a lubricating oil thickened to a heavy consistency by the incorporation and grinding therein of sixty pounds of zinc white, twenty pounds of graphite, and twenty pounds of asbestos.

4. A lubricant compound consisting of lubricating oil thickened to a heavy consistency by the incorporation in grinding therein of finely divided zinc white, graphite and asbestos.

Signed by me this 8th day of September, 1926.

RALPH PAGE JUDD.